United States Patent
Smook

(10) Patent No.: US 7,537,391 B2
(45) Date of Patent: May 26, 2009

(54) ROLLER BEARING

(75) Inventor: Warren Gregory Smook, Gauteng (ZA)

(73) Assignee: Hansen Transmissions International, naamloze vennootschap, Edegem (BE)

( * ) Notice: Subject to any disclaimer, the term of this patent is extended or adjusted under 35 U.S.C. 154(b) by 324 days.

(21) Appl. No.: 10/585,944

(22) PCT Filed: Feb. 2, 2005

(86) PCT No.: PCT/BE2005/000013

§ 371 (c)(1),
(2), (4) Date: Jul. 13, 2006

(87) PCT Pub. No.: WO2005/075843

PCT Pub. Date: Aug. 18, 2005

(65) Prior Publication Data

US 2007/0127859 A1   Jun. 7, 2007

(30) Foreign Application Priority Data

Feb. 3, 2004   (GB) ................. 0402255.4

(51) Int. Cl.
*F16C 33/58* (2006.01)
(52) U.S. Cl. .............. 384/513; 385/569; 385/581; 385/563
(58) Field of Classification Search ........ 384/513, 384/517, 536, 548, 561–565, 567, 569, 581; 29/898.041, 898.061, 898.062
See application file for complete search history.

(56) References Cited

U.S. PATENT DOCUMENTS

| 3,504,955 | A | | 4/1970 | Joseph |
| 3,604,545 | A | * | 9/1971 | Bourgeois .............. 384/536 |
| 4,002,380 | A | | 1/1977 | Bowen et al. |
| 5,020,925 | A | * | 6/1991 | Stephan et al. .......... 384/569 |
| 5,086,560 | A | * | 2/1992 | Glazier .................. 29/898.061 |
| 6,682,226 | B2 | * | 1/2004 | Kotzalas et al. ........ 384/563 |
| 7,032,704 | B2 | * | 4/2006 | Zernickel et al. ....... 384/567 |
| 2003/0210843 | A1 | | 11/2003 | Kotzalas et al. |

FOREIGN PATENT DOCUMENTS

GB   2 012 008   7/1979
SU   815351 B   *   2/1992

OTHER PUBLICATIONS

Patent Abstracts of Japan, vol. 011, No. 310 (M-630), Oct. 9, 1987 & JP 62 098025 A (Koyo Seiko Co Ltd), May 7, 1987 abstract.

* cited by examiner

*Primary Examiner*—Marcus Charles
(74) *Attorney, Agent, or Firm*—Young & Thompson

(57) ABSTRACT

A roller bearing (10) includes a plurality of bearing rollers (12) located between confronting bearing surfaces (16, 19), the bearing surfaces being rotatable one relative to the other about the rotational axis of the bearing, and the bearing including biasing elements (18) which provides a force acting in a direction between the confronting bearing surfaces (16, 19) whereby, under all load conditions for which the bearing is designed for use, each bearing roller is retained in contact with each of the confronting bearing surfaces.

20 Claims, 2 Drawing Sheets

ROLLER BEARING

CROSS-REFERENCE TO RELATED APPLICATIONS

This is a National Stage Application of PCT/BE2005/000013 filed on Feb. 2, 2005 and claiming priority to Great Britain Application No. 0402255.4 filed on Feb. 3, 2004.

BACKGROUND OF THE INVENTION

1. Field of the Invention

This invention relates to a roller bearing and in particular, though not exclusively, to a roller bearing for use in applications, such as in the gear units of wind turbines, in which skidding (also known as sliding) may occur between the rollers and raceway (bearing) surfaces.

2. Description of Related Art

When the rotational speed of rollers in a roller bearing is insufficient to ensure pure rolling of the raceways, skidding may occur between the rollers and raceway surfaces. Rollers typically decelerate in their rotational speed when in the unloaded zone of the bearing and accelerate in rotational speed due to contact with the raceways when in the loaded zone. The force needed to accelerate the rollers is, among other factors, dependent on the speed difference between the roller and raceway surfaces, and also the roller inertia. Prolonged skidding is undesirable because it can cause surface damage, such as material smearing, and lead to bearing failure. In particular, metal to metal contact can occur when the aforementioned operating conditions lead to an insufficient oil layer thickness, that resulting in a generation of heat which can cause skid smearing and subsequent bearing failure.

When bearings run under low or zero load conditions, the loaded zone becomes very small or does not exist. In consequence relative sliding between the roller and raceway surfaces is likely to occur. If a load is then suddenly applied to the bearing and the relative surface speeds of the rollers and raceways is high, smearing of material could occur as the rollers are accelerated. Over a period of time this can lead to significant surface damage.

In the multi-stage gear units of wind turbines the aforementioned conditions often can arise in respect of the bearings of the high speed and intermediate shafts. Turbulence in the wind can cause drastic load changes on the gear unit and cause rollers to decelerate during low-load and accelerate again when the load increases. During controlled deceleration of the wind turbine rotor blades, e.g., to a stationary condition, the torque direction on the shafts of the gear unit can often reverse, leading to a shift in the loaded zone position and roller skidding.

BRIEF SUMMARY OF THE INVENTION

The present invention seeks to provide a roller bearing in which the aforedescribed problems which can lead to bearing failure are mitigated or overcome.

In accordance with one aspect of the present invention there is provided a roller bearing comprising a plurality of bearing rollers located between confronting bearing surfaces, the bearing surfaces being rotatable one relative to the other about the rotational axis of the bearing, and the bearing comprising biasing means which provides a force acting in a direction between the confronting bearing surfaces whereby, under all load conditions for which the bearing is designed for use, each bearing roller is retained in contact with each of the confronting bearing surfaces.

The invention is particularly applicable to a roller bearing of the type which, in use, is loaded primarily in a radial direction, the bearing thus comprising bearing rollers located radially between inner and outer bearing surfaces as considered relative to the rotational axis of the bearing and having the biasing means providing a force which acts in a radial direction relative to the axis of rotation. Alternatively, however, the roller bearing of the invention may be of a type which, in use, is loaded primarily in an axial direction, the bearing thus comprising bearing rollers located axially between confronting, axially spaced, bearing surfaces as considered relative to the direction of the rotational axis of the bearing and having the biasing means providing a force which acts in the axial direction.

The bearing surfaces may be provided by a pair of bearing rings in conventional manner, for example inner and outer bearing rings in the case of a radial type roller bearing. Alternatively one or each of the bearing surfaces may be defined by the surface of another component in an integrated type construction in which the other component performs an additional function.

The invention is of particular applicability to a roller bearing in which the bearing rollers are cylindrical, such as in a radial type bearing, but may be employed also for bearings comprising taper type bearing rollers, such as may be used in an axial type bearing, or other types of roller bearings such as spherical roller bearings and CARB toroidal roller bearings.

The biasing force may be provided by deformability of the or each bearing roller per se which thus will serve as the biasing means, or may be provided by an additional element, for example a deformable element secured relative to one of the confronting bearing surfaces. Additionally or alternatively it is envisaged that a bearing surface may serve as the biasing means to provide the biasing force, for example by virtue of a part of a bearing surface being of a non-cylindrical shape when in an unstressed condition, and deformable slightly towards a cylindrical shape (in the case of a cylindrical roller bearing) when acted upon by a bearing roller located between confronting surfaces.

A bearing roller may be adapted to act as the biasing means by providing that when in an unloaded condition the body of material which defines an end region of the roller, as considered in the direction of the axis of rotation of the roller, is provided with an undercut or similarly relieved formation, and that the outer surface of the roller has a dimension which is greater than that of the outer surface at a position axially inwards from the end region. The end region thus may be provided with a radially inwardly deformable overhang or lip-like region which, in the assembled bearing, is deformed inwards thereby to result in the bearing roller having, as considered in longitudinal cross-section, a substantially rectilinear bearing surface and also exerting the aforedescribed biasing force to maintain contact between the roller and each of the confronting bearing surfaces. Preferably each end region of the roller is of a similar shape.

In a manner substantially equivalent to the roller construction described in the preceding paragraph, one or each of the confronting bearing surfaces may have at least one end region which is deformable i.e. deformable in a radial direction in the case of a radial type bearing or deformable in an axial direction in the case of an axial type bearing. An undercut or other such end relief preferably is formed in that half of the thickness of a bearing ring which is adjacent the bearing surface of that bearing ring.

The present invention does not require that either of the bearing surfaces or the rollers necessarily shall comprise an integral region of a shape which is more readily deformable than the remainder of the body of the respective bearing ring or roller. The invention provides that in addition or alternatively each bearing roller and/or at least one of the bearing surfaces may have associated therewith a deformable component which serves as biasing means. The deformable component may comprise a material which is compressible and/or may be compressible in consequence of flexibility and shape of the component. Preferably the component is elastically deformable, and more preferably is an elastomeric material.

The roller bearing of the invention may comprise a bearing cage or may be cageless, e.g., it may be of the full complement type.

The invention provides also a multi-stage gear unit in which at least one of a high speed and intermediate shaft is supported by a roller bearing of a type in accordance with the present invention.

BRIEF DESCRIPTION OF THE DRAWINGS

Embodiments of the present invention will now be described, by way of example only, with reference to the accompanying diagrammatic drawings in which.

DESCRIPTION OF THE PREFERRED EMBODIMENTS

Figure 1:
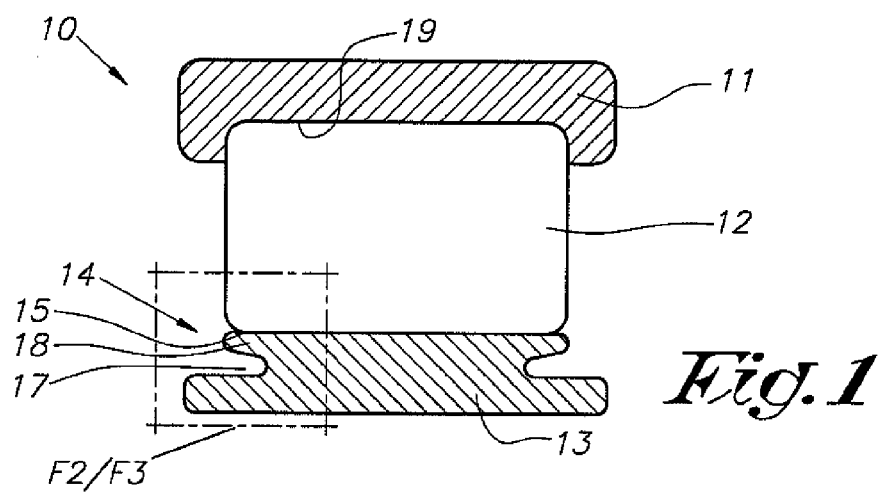
FIG. 1 is a cross-section of part of a roller bearing in accordance with a first embodiment of the present invention.

FIG. 1 shows part of radial type roller bearing 10 comprising an outer bearing ring 11, an inner bearing ring 13 and one of a plurality of cylindrical roller bearings 12 positioned between the confronting bearing surfaces 16, 19 of the inner and outer rings.

Figure 2:
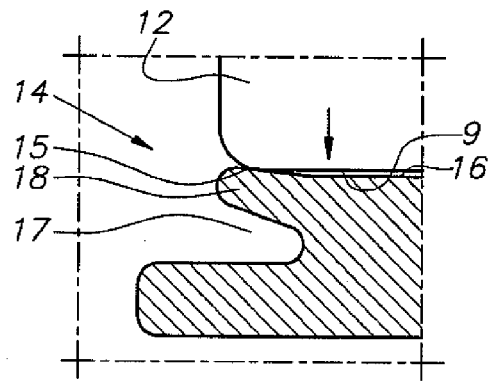
FIGS. 2 and 3 show respectively a part of the bearing of FIG. 1 before and after the bearing has been assembled.

The inner ring 13 (see FIG. 2) is machined to provide at each end region 14 a circumferentially extending zone 15 which protrudes radially outwards above the normal working surface 16. In addition, the end region 14 is formed with an annular recess 17 in the radially outer half of the thickness of the ring 13 thereby to form a radially deformable lip region 18 which comprises the zone 15. Thus the radial stiffness of the inner ring is reduced at the end region. The extent to which the zone 15 protrudes above the bearing surface 16 and flexibility of the lip region 18, are selected having regard to factors which may include the amount of radial clearance in the bearing, operating speed and roller inertia.

Figure 3:
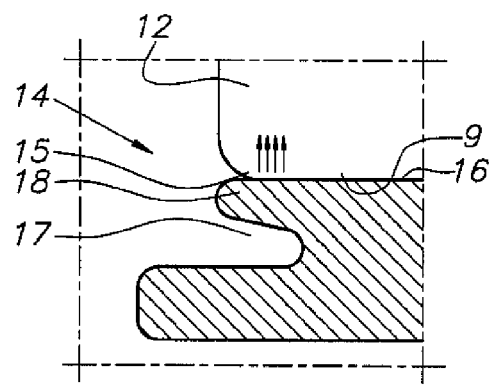

When the bearing is in an assembled condition (see FIG. 3) the lip region 18 is deformed radially inwards due to contact with the bearing surfaces 9 of the rollers 12 which are thereby also urged radially outwards to bear against the outer ring 11.

Figure 4:
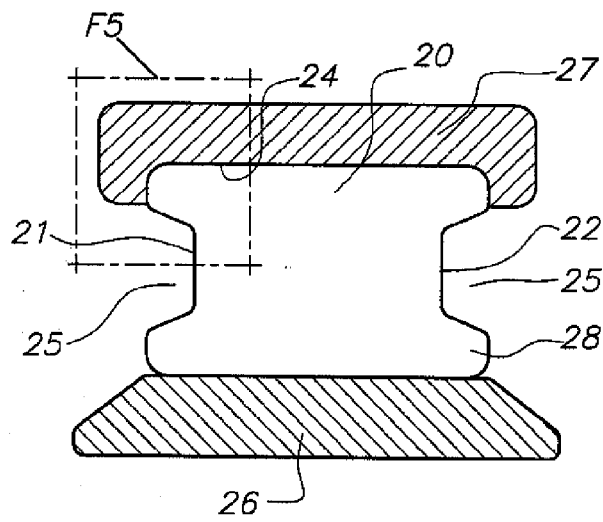
FIG. 4 shows in cross-section part of a roller bearing in accordance with a second embodiment of the present invention.
Figure 5:
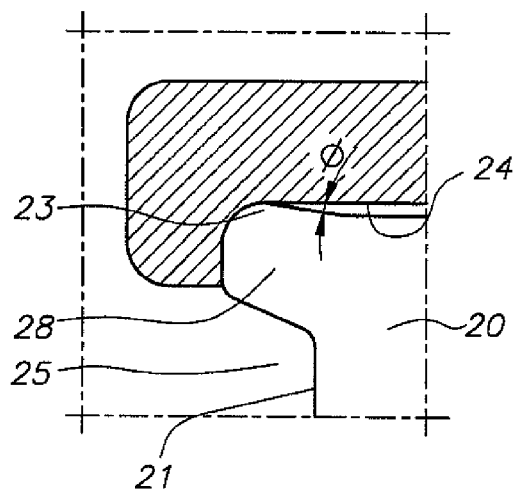
FIG. 5 shows a part of the bearing of FIG. 4 before the bearing has been assembled.

FIG. 4 shows an embodiment in which a protrusion and undercut are provided on each roller instead of one or each bearing ring as above described.

The roller 20 is machined to provide, at each end 21, 22, a zone 23 which protrudes radially outwardly from the intervening bearing surface 24 when the roller is in an unloaded condition. Additionally each end is formed with a recess 25 such that a pair of deformable annular lip regions 28 are formed. In the assembled condition as shown in FIG. 4 the lip regions act as biasing means to maintain contact between the roller and each of the inner and outer bearing rings 26, 27.

Figure 6:
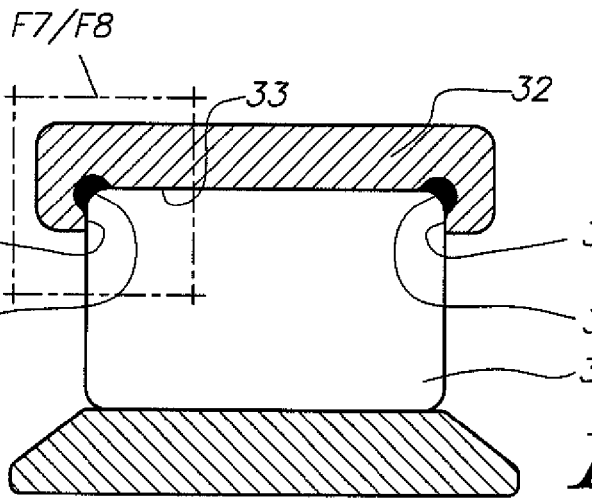
FIGS. 6 to 8 show, in relation to a third embodiment of the present invention, views corresponding to those of FIGS. 1 to 3.
Figure 7:
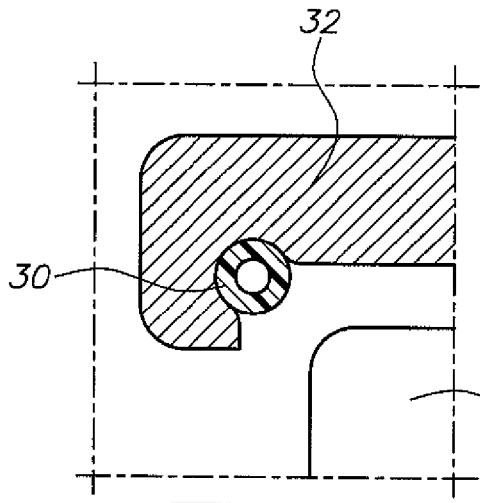
Figure 8:
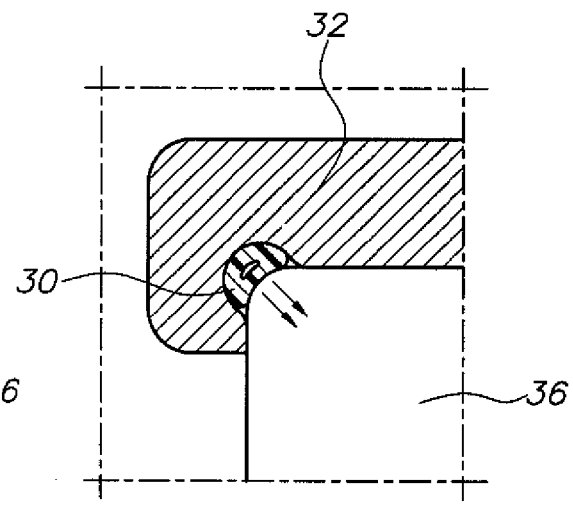

In the embodiment of FIGS. 6 to 8 biasing means is provided in the form of a pair of compressible elastomeric rings 30, 31 position in the corner regions of the outer ring 32, between the cylindrical bearing surface 33 and respective axial abutment faces 34, 35. In this embodiment the biasing rings 30, 31 are of a hollow, tubular form thereby to provide compressibility primarily by virtue of the shape of each ring, but rings of a solid cross-section and of compressible material alternatively may be employed. FIG. 7 shows a biasing ring 30 in an unstressed condition and FIG. 8 shows that biasing ring in situ compressed between the outer bearing ring 32 and the corner of a roller 36.

Figure 9:
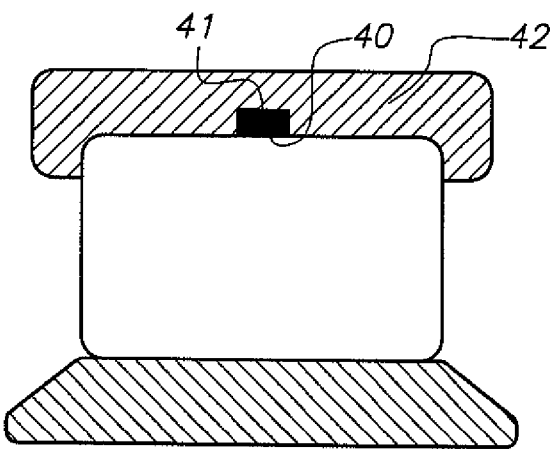
FIG. 9 shows in cross-section part of a roller bearing in accordance with a fourth embodiment of the present invention.

In an alternative configuration, shown in FIG. 9, a solid section biasing ring 40 of compressible material is provided in an annular groove 41 formed centrally in the bearing surface of the outer bearing ring 42.

In each of the embodiments of FIGS. 6 to 9 the biasing ring serves to ensure that the roller is maintained in contact with, and experiences the relative rotational movement between, the inner and outer bearing rings.

In the aforedescribed embodiments of the invention the load bearing capacity of the bearing is less than that of a standard, conventional bearing of otherwise similar construction because of the fact that the load carried by the low stiffness zones is insignificant. However, although such bearings may be more expensive as compared with a standard bearing, they will have the advantage of better resisting slip phenomena, which in many cases is the underlying cause of ultimate bearing failure.

The invention claimed is:

1. A roller bearing (10) comprising:
    a plurality of bearing rollers (12) located between confronting bearing surfaces (16,19),
    said confronting bearing surfaces being rotatable one relative to the other about a rotational axis of the bearing, and
    biasing means (18) which provides a biasing force acting in a direction between said confronting bearing surfaces (16,19), said biasing force provided by deformability of i) at least one of the confronting bearing surfaces (16,19) or ii) at least one of said bearing rollers (20),
    wherein i) an edge region of a bearing surface of at least one of said confronting bearing surfaces or ii) a bearing surface of said at least one bearing roller, when in an unstressed condition, comprises a zone (15,23) which protrudes above an adjacent surface region to said bearing surface, which edge region, in the assembled bearing, exerts the aforementioned biasing force, in such a way that under all load conditions for which the bearing is designed for use, each bearing roller is retained in contact with each of said confronting bearing surfaces.

2. A roller bearing according to claim 1, wherein the body of material which defines at least one of said confronting bearing surfaces, or the bearing surface of a roller, comprises an undercut at an edge region of that bearing surface thereby to provide between the undercut and bearing surface a deformable overhang region (18,28).

3. A roller bearing according to claim 2, wherein a bearing ring (13) defines one of said confronting bearing surfaces and comprises said undercut (17), said undercut being provided in that half of the thickness of the ring which is adjacent the bearing surface of said ring.

4. A roller bearing according to claim 1, wherein a bearing ring (13) defines one of said confronting bearing surfaces and is provided with an undercut (17), said undercut being provided in that half of the thickness of the ring which is adjacent the bearing surface of said ring.

5. A roller bearing according to claim 1, wherein each of the two edge regions of a bearing surface is provided with a deformable overhang.

6. A roller bearing according to claim 1, wherein at least one of the confronting bearing surfaces has associated therewith a deformable component (30,40) to serve as said biasing means.

7. A roller bearing according to claim 6, wherein said deformable component (30) is deformable by virtue of the shape and flexibility of the component.

8. A roller bearing according to claim 7, wherein the deformable component (40) is deformable by virtue of compressibility of the material of the component.

9. A roller bearing according to claim 7, wherein the deformable component is a biasing ring (30) positioned between the bearing surface (33) of one of said confronting bearing surfaces and an abutment surface (34) associated with said bearing surface.

10. A roller bearing according to claim 7, wherein the biasing means is a biasing ring (40) provided substantially centrally between end regions of a bearing surface.

11. A roller bearing according to claim 6, wherein the deformable component (40) is deformable by virtue of compressibility of the material of the component.

12. A roller bearing according to claim 11, wherein the deformable component is a biasing ring (30) positioned between the bearing surface (33) of one of said confronting bearing surfaces and an abutment surface (34) associated with said bearing surface.

13. A roller bearing according to claim 6, wherein the deformable component is a biasing ring (30) positioned between the bearing surface (33) of one of said confronting bearing surfaces and an abutment surface (34) associated with said bearing surface.

14. A roller bearing according to claim 6, wherein the biasing means is a biasing ring (40) provided substantially centrally between end regions of a bearing surface.

15. A roller bearing according to claim 1 and which is a radial roller bearing.

16. A roller bearing according to claim 1, wherein the bearing rollers are cylindrical.

17. A roller bearing according to claim 1, wherein the bearing rollers each comprise ends (21, 22) with a recess (25) defining a pair of deformable annular lip regions (28), the zone being located on a surface of the lip regions remote from the recess.

18. A roller bearing according to claim 1, wherein the roller bearing is mounted on one of a high speed and intermediate speed gear unit shaft.

19. A roller bearing (10) comprising:
an outer bearing ring (11) with a first bearing surface (19);
an inner bearing ring (13) with a second bearing surface (16);
a plurality of bearing rollers (12, 20) with respective roller surfaces, said bearing rollers positioned between said outer bearing ring and said inner bearing ring so that said first bearing surface and said second bearing surface are confronting bearing surfaces (16, 19) with the first bearing surface rotatable relative to the second bearing surface; and
a biasing part (18, 23, 30, 42) providing a sufficient bias force acting, in an unloaded condition, to separate an adjacent portion of a corresponding one of said confronting bearing surfaces (16, 19) from a corresponding portion of an adjacent roller surface of one of said bearing rollers,
said biasing part located in one of
i) an edge region of one of said inner and outer rings, said biasing part at said edge region providing a deformability of said one ring at said adjacent portion of said one confronting bearing surface (16,19) thereby resulting in the bias force acting in the direction between said confronting bearing surfaces (16,19) to separate the adjacent portion of the corresponding one said confronting bearing surface (16, 19) from the corresponding portion of the adjacent roller surface of the one said bearing roller, and
ii) the roller bearing surface of said one bearing roller, said biasing part at the roller bearing surface portion of said one bearing roller providing a deformability of said one bearing roller resulting in the bias force acting in the direction between said confronting bearing surfaces (16, 19) to separate the adjacent portion of the corresponding one said confronting bearing surface (16, 19) from the corresponding portion of the adjacent roller surface of the one said bearing roller, wherein,
said biasing part at said edge region or said biasing part at said roller bearing surface defines, in the unloaded condition, a protruding zone (15, 23),
said protruding zone, in the unloaded condition, protruding above an adjoining surface region such that the adjacent portion of the corresponding one said confronting bearing surface (16, 19) is free on contact with the corresponding portion of the adjacent roller surface of the one said bearing roller,
and, in an assembled condition, said biasing part relocates such that the adjacent portion of the corresponding one said confronting bearing surface (16, 19) is in contact with the corresponding portion of the adjacent roller surface of the one said bearing roller.

20. A roller bearing according to claim 19, wherein the biasing part is at least one compressible ring (30, 40) located within a groove at said edge region of said one ring.

* * * * *